Phillip M. Cruse
INVENTOR.
BY
ATTORNEY.

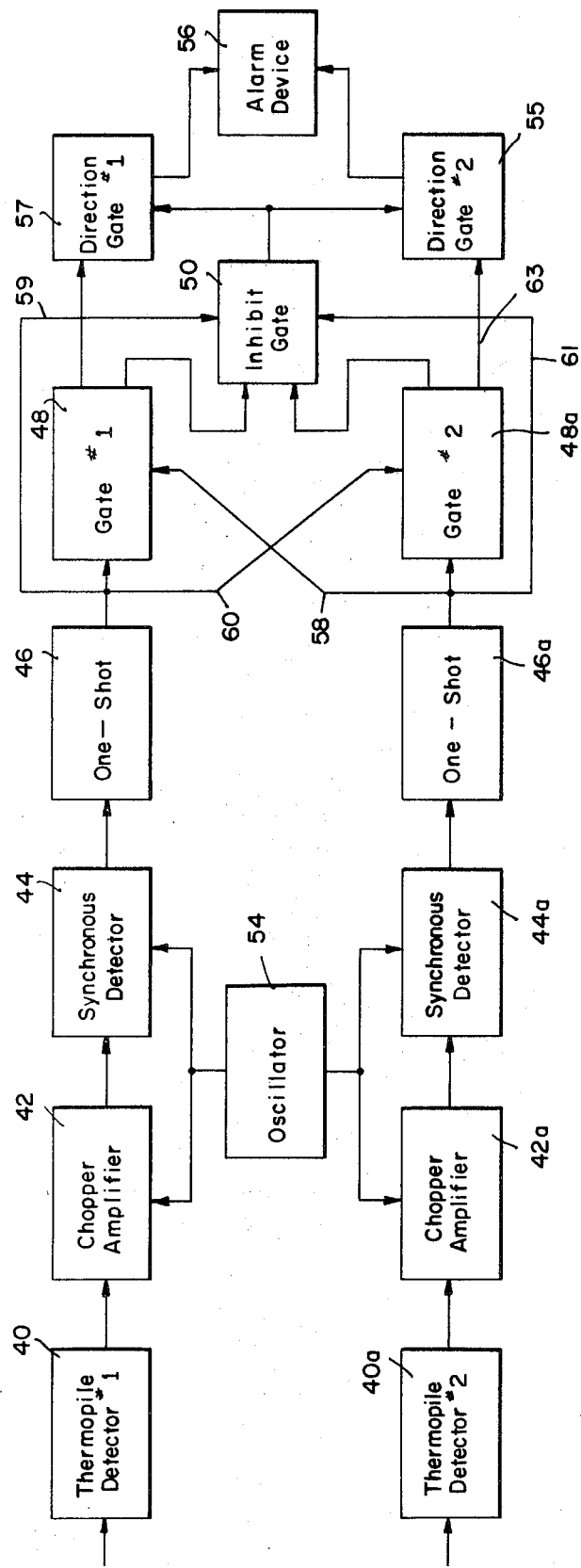

United States Patent Office 3,524,180
Patented Aug. 11, 1970

3,524,180
PASSIVE INTRUSION DETECTING SYSTEM
Philip M. Cruse, Santa Barbara, Calif., assignor to Santa Barbara Research Center, Goleta, Calif., a corporation of California
Filed Jan. 27, 1967, Ser. No. 612,210
Int. Cl. G08b *13/18*
U.S. Cl. 340—258
6 Claims

ABSTRACT OF THE DISCLOSURE

A pair of thermopile infrared radiation detectors are focused upon parallel fields of view in relatively close relation to each other. A radiation-emitting object passing through the fields of view normally sequentially cuts the fields of view in a determined time pattern. The time pattern results in the initiation of sequential signals at determined intervals which actuate an appropriate alarm. The interruption of both fields of view by the infrared-emitting object in less than the determined time interval creates an inhibit situation which prevents alarm actuation.

---

The invention relates to a passive intrusion detection system that has particular utility in the efficient surveillance of determinned physical areas to provide intelligence of the entrance into the area of persons or objects.

The subject invention incorporates a unique application of infrared technology coupled with novel electronic indicating circuitry which provides an invisible yet accurate surveillance of determined physical areas to detect entrance to that area of human beings or other objects. This system is particularly useful in the surveillance, for example, of military compounds or other installations in rather remote geographical areas. Additionally, the system may be used as an intrusion indication apparatus in conventional burglar alarm systems used to protect commercial and industrial installations. The disclosed system is simple in operation, highly efficient, and readily portable so that it may be quickly installed and provide surveillance protection for the users thereof.

It is well known that an object having a body temperature above absolute zero emits radiation in the invisible spectrum commonly known an infrared radiation. For example, human beings and vehicles, such as automobiles, trucks, tanks, aircraft, and the like, emit radiation in the 8-to-15 micron wavelength region. Detectors have been recently developed which are sensitive to the reception of such infrared radiation and which generate an electrical pulse responsive to its receipt. A major problem in employing infrared-sensitive detectors in surveillance systems has been that the detector could not discriminate as to the source of the received radiation. For example, a detector coupled with appropriate optics may be focused on a determined field of view and all radiation emanating from that field wound be received by the detector. Hence, though an appropriate electrical signal may be generated by the received radiation, no mode was provided so that the operator could intelligently discriminate as to the source thereof. For example, radiation could originate in the physical background of the field of view or result from the entrance into the field of view of such inocuous sources as birds or reflected sunlight and the like. In short, deices have not heretofore been available to distinguish between a genuine intrusion of the type being surveyed and an environmental false alarm.

Accordingly, it is a primary object of the invention to provide a novel combination of infrared detection devices coupled with appropriate electronic signalling circuitry to provide an effective and efficient intrusion detection system.

It is a further object of the invention to provide an intrusion detection system of the type described operatively arranged to effectively discriminate and identify the type of intrusion under surveillance.

It is a specific object of the invention to provide a plurality of infrared detection devices coupled with optical systems which define a plurality of fields of view each in determined physical relation to each other. Appropriate electronic processing circuitry is associated with the respective detectors which effectively limits the energizing of an alarm system to selected intrusion patterns and thus eliminates response from false signal input.

These and other advantages and features of the invention will become apparent in the course of the following description and from an examination of the related drawings, wherein:

FIG. 1 is a partially schematic, vertical, sectional view of a detector and optical arrangement which may be used in the disclosed invention;

FIG. 3 is a block circuit diagram illustrating the operation of the intrusion detecting system.

Figure 4:
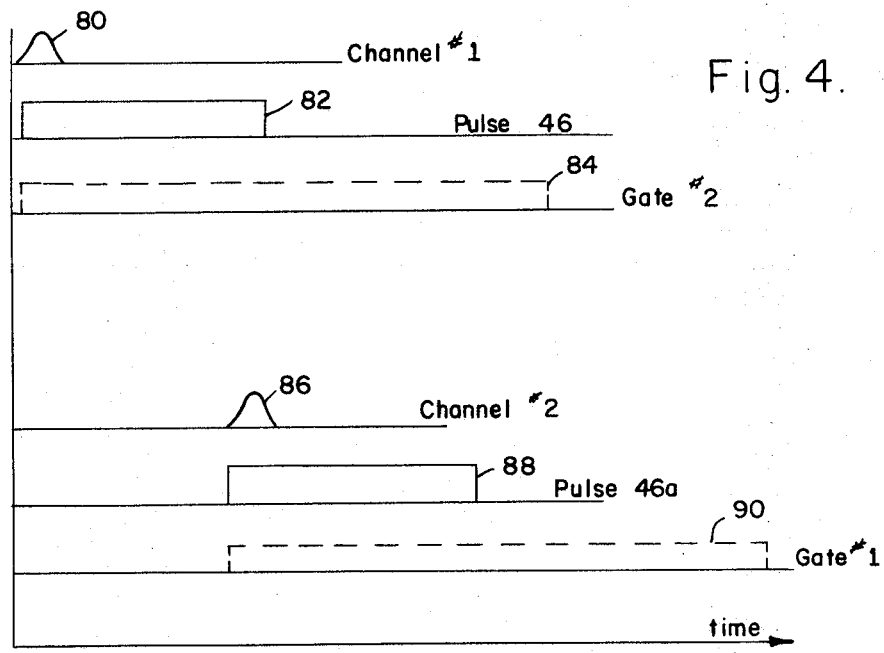
FIG. 4 is a graph illustrating the logical operation of the arrangement in relation to time.

Referring to the drawings, it will be understood that the present invention may employ many of the infrared detection devices currently available. One such device which provides efficient detection of infrared radiation in the 8-to-15 micron wavelength range is a recently developed thermopile detector. These detectors are highly sensitive to the noted infrared radiation and function efficiently at relatively normal ambient temperature ranges without the necessity of artificial cooling.

It is well known that infrared radiation emitted by the human body peaks in the 8-to-15 micron wavelength range and that this spectral region provides excellent transmission through water vapor, haze, and other atmospheric contamination. With this in mind, it will be readily apparent that the hereinafter described invention is particularly useful for the described surveillance under virtually all ambient conditions where the surreptitious entry of human beings into a determined area is to be discovered.

FIG. 1 shows an appropriate thermopile detector 10 mounted on a support plate 12 and electrically connected (not shown) with an electronic package 14. An optical arrangement for the detector 10 comprises an annular cylinder 16 having an open viewing face 18 which defines the system field of view. An annular window 20 is provided and may be any suitable material. If desired, to limit transmitted radiation to the 8-to-15 micron range, the widow may be made of an appropriate filter material and thereby act to eliminate all radiation other than that falling within the desired spectral band. At the right aspect of the cylinder 16 a primary reflecting mirror 22 is provided having an arced face 24 which reflects and transmits received radiation to a secondary mirror 26, the latter combining with the primary mirror to focus the radiation at the detector 10. Annular baffies may be provided at 28 and 30 to shield the detector 10 from extraneous and diffuse radiation falling outside of the field of view.

Figure 2:
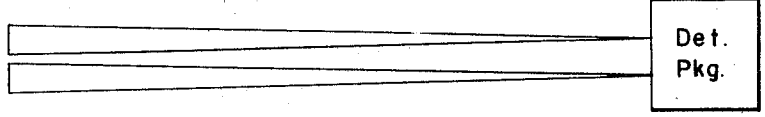
FIG. 2 is a diagrammatic plan view of a typical surveillance installation.
Figure 2A:
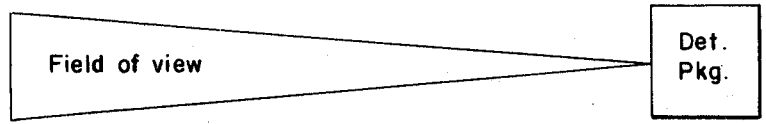
FIG. 2a is a diagrammatic side view of the installation of FIG. 2.

In a preferred embodiment of the invention the arrangement illustrated in FIG. 1 is duplicated and two thermopile detectors are positioned in side-by-side relation. FIGS. 2 and 2a are appropriate diagrammatic illustrations. Note in FIG. 2 each detector is focused upon a field of view which represents side-by-side areas of view in space. Each area or field of view may be understood to be pyramidal in form covering a plane area of about two feet by six feet at a distance of six hundred feet from the detector package when the detectors in the package are rectangularly formed and spaced from each other about .012 inch. In this configuration, it will be apparent that an intruding object must first pass through one field of view and sequentially thereafter pass through a second field of view. A ground moving object such as a man or truck cannot interrupt both view fields in the same instant of time. Of course, the geometry of the fields of view may be changed by appropriate dimensional changes in detector size and relative location or variation of the optical system.

The configuration described is an important feature in distinguishing false intrusional alarms from the type desired to be surveyed. It is characteristic that false infrared signals, due to puffs of wind, diffuse or reflected rays of sunlight, or background movements of foliage, and the like, will energize both parallel detectors and interrupt both fields of view substantially simultaneously. Alternately, the intrusion of a walking or running person or a moving vehicle, such as a truck, or the like, will sequentially interrupt the fields of view and be sensed first by one detector and thereafter by the other.

FIG. 3 is a block diagram of a typical circuit arrangement associated with the parallel detector and optical systems. The numeral 40 designates a first thermopile detector and optical arrangement while the numeral 40a indicates the second thermopile detector and optical system. Thus, there are two electrical series channels comprising chopper amplifiers 42 and 42a, synchronous detectors 44 and 44a, one-shot electrical signal pulse generators such as pulse width generators 46 and 46a, and gates 48 and 48a. A common inhibit gate 50 communicates with both channels via the first gate 48 and the second gate 48a. A common oscillator 54 is arranged to electrically drive the chopper amplifiers 42 and 42a and the synchronous detectors 44 and 44a. A signal console or other warning alarm device 56 is electrically connected to inhibit gate 50 to receive signals therefrom through direction gates 55 and 57. Lines 58 and 60 interconnect the output signal from the pulse width generators 46 and 46a with opposed gates 48 and 48a, respectively. Lines 59 and 61 transmit the output signal from generators 46 and 46a to inhibit gate 50.

In operation, it will be assumed that the fields of view of the thermopile and optical systems 40 and 40a are respectively sequentially interrupted by a viable intrusion such as a walking man. Assuming detector 40 first receives radiation from the interruption, a relatively slow or essentially D.C. signal is generated by the detector 40 and carried to chopper amplifier 42 which transforms the received signal into a high-frequency A.C. signal output. The high frequency output of amplifier 42 may be further intensified by the conventional synchronous detector 44, the output of the latter triggering a determined pulse of fixed amplitude and determined length from the generator 46. Gate 48 halts the signal from generator 46. However, the signal from generator 46 is carried via line 60 to gate 48a and acts to open that gate; the same signal moves via line 63 to open direction gate 55. In a relatively short elapsed time period, the field of view of thermopile detector 40a is interrupted by the same radiation source that interrupted detector system 40. Again, its relatively slow or essentially D.C. output signal is amplified and converted into a high frequency A.C. signal by chopper amplifier 42a and that signal is increased in intensity by detector 44a. The output of detector 44a energizes generator 46a and a one-shot electrical pulse of identical amplitude with that created by generator 46 is carried to gate 48a. It will be recalled that gate 48a has been opened by the signal from generator 46 which allows the output pulse of generator 46a to be conveyed to the normally open inhibit gate 50. The signal passes through inhibit gate 50, through open direction gate 55, and alarm device 56 is energized in a first mode of operation, for example, a flashing light. An operator at the device 56 is thus advised of the intrusion and the fact that the channel at detector 40 was interrupted prior to that at detector 40a then indicating direction of intrusion.

It will be apparent that an identical mode of operation will result in the event the channel at thermopile 40 receives the initial interruption from a valid intrusion. In this event, pulse generator 46a opens gate 48 and concurrently opens direction gate 57. Gate 61 prevents the pulse from generator 46a from being carried to inhibit gate 50. Upon sequential interruption of channel at detector 40, the signal thus created by generator 46 passes through gate 48 to the normally open inhibit gate and through the now open direction gate 57 to the alarm device 56. The alarm device 56 will be energized in a second mode of operation, for example, a continuous light, thus advising the operation of an intrusion and the fact that the channel at detector 40a was first interrupted thereby indicating the direction of intrusion.

In the event an artificial signal substantially concurrently interrupts the parallel fields of view of detectors 40 and 40a, respectively, concurrent signals will be generated thereby which are transformed into high frequency A.C. signals amplified and used to concurrently energize generators 46 and 46a respectively. The concurrent outputs of the generators 46 and 46a respectively open gates 48 and 48a as above described and both signals are passed to the inhibit gate 50. However, the pulses from generators 46 and 46a are simultaneously carried to gate 50 via lines 59 and 61. These pulses initiate a closure of gate 50 preventing signal transmission to the alarm device 56.

It will be noted in the operative description above that the amplitude of the signals generated by the circuitry are identical. With identical amplitudes, the operation of the arrangement is not responsive to relative intensity of received radiation by detector systems 40 and 40a. The advantage of this arrangement will be apparent when it is considered that systems 40 and 40a, respectively, see different fields of view, the physical background of which will vary. Accordingly, it can be anticipated that the amplitude of the signals created during interruption, even by a true sequential interruption, will vary as a result of background radiation. Consequently, amplitude variation cannot be relied upon as an indication of false intrusion signal.

The graph of FIG. 4 is illustrative of the operation of the arrangement. For example, a pulse of radiation may be received in channel No. 1 and the signal is thereby created, indicated by wave 80, FIG. 4. The wave 80 creates a fixed amplitude output pulse from generator 46 as shown at 82 in the figure. The pulse 82 created by the generator 46 opens gate 48a and direction gate 55 for a determined time increment as shown by the dotted line 84. For example, this may be on the order of one second. The pulse 82 from the generator 46, of course, is carried to the gate 50 via line 59. In the event channel No. 2 is interrupted substantially concurrently with the interruption at channel No. 1, a pulse as shown at 86 is created in thermopile detector 40a. This in turn creates a uniform amplitude pulse from generator 46a as shown at 88 which may have the same time duration as the pulse created at 82. Pulse 88 opens gate 48 which in turns opens direction gate 57. The time duration during which gate 48 and gate 57 remain open is indicated by the dotted line 90. It will be noted that pulse 82 and pulse 88 overlap slightly in point of time and so a partially concurrent signal will be delivered via line 61 to inhibit gate 50. The concurrence of the signal in point of time in lines 59 and 61 closes normally open inhibit gate 50 and prevents a signal being transferred therethrough to alarm device 56. Thus, erroneous signals which do not indicate the type of intrusion being surveyed will not activate alarm device 56.

Generators 46 and 46a may be manually altered (not shown) in a conventional manner so that the time duration of their electrical pulse signal outputs may be varied. It will be apparent that the length of the pulses affect whether or not there will be an overlap signal created at 82 and 88 which will close inhibit gate 50. Thus, generators 46 and 46a may be set for time durations depending upon the type of expected intrusion being surveyed. For example, if the arrangement is set up anticipating the detection of a walking man, generators 46 and 46a may be set to create a timing pulse of approximately 60 milliseconds. With the spacing as above described between the detector's field of view, a walking or running man will not substantially coextensively interrupt the fields of view to create a false alarm signal. On the other hand, if it is anticipated that the intrusion being monitored would be rapidly moving vehicles, the time length of pulses 82 and 88 may be substantially shortened to, for example, 20 milliseconds. Thus, even a rapidly moving automobile or truck interrupting the noted fields of view will not create substantially concurrent signals which would close inhibit gate 50.

It will be noted again that gates 48 and 48a are opened by pulses from generators 46a and 46 respectiaely. The gates 48 and 48a are preferably of the type that will automatically close in a determined time interval, for example, the noted one second, and thereby the entire system would be reset to detect rapid sequential intrusions into the area being surveyed.

From the above, it will be apparent that the arrangement comprises a novel, efficient, easily portable intrusion detection arrangement particularly adapted to automatically eleminate false intrusion signals and thus provide accurate area surveillance. Signal designation is particularly the result of employing multiple detectors having generally paralleled but independent fields of view with the result that the time variation inherent in typical intrusion signals may be used for the intelligent selection of true signals from false alarms. An additional advantage lies in the fact that the system may be arranged to automatically advise the system operator of the general direction of motion of the intruding body.

The invention as disclosed is by way of illustration and not limitation and may be modified in many respects within the spirit and scope thereof.

What is claimed is:
1. In a surveillance system to detect object intrusion into an area,
   a plurality of devices sensitive to radiation emitted by said intruding object and operative to create an initiating signal in response thereto,
   means respectively associated with the devices to limit each device to seeing separate determined fields of view in said area,
   the respective fields of view being in determined relation to each other,
   means associated with said devices to create a signal in response to intrusion of an object into said area, and sequentially into said respective fields of view,
   and control means associated with said devices for energizing an alarm in response to the sequential intrusion of said object into said fields of view, said control means including circuitry adapted to inhibit the energization of said alarm whenever said initiating signals are temporally coextensive,
   wherein said control means comprises generally parallel electrical channels associated with the respective devices,
   each channel being operative to receive and modify one of said initiating signals,
   each channel having gate means therein to normally inhibit the transmission of the initiating signal to the alarm means and thereby prevent energizing of the latter,
   the first reception and modification of an initiating signal in one of said channels being operative to open the gate means in the other of said channels and thereby accommodate the transmission of the initiated and modified signal in said other channel to the alarm means to energize same.

2. A surveillance system to detect object intrusion into an area according to claim 1,
   wherein each channel comprises in electrical series the detecting device,
   chopping and amplifying means for said initiating signal,
   pulse means to generate a pulsed signal of determined amplitude and duration and said gate means to normally inhibit signal transmission.

3. A surveillance system to detect object intrusion into an area according to claim 2, wherein said pulsed signals generated in the respective channels are operative to open the gate means in the other channel.

4. A surveillance system to detect object intrusion into an area according to claim 3,
   wherein said pulse means generate pulsed signals of equal amplitude and determined time length,
   and means to indicate the field of view initially interrupted by said intruding object.

5. A surveillance system to detect object intrusion into an area according to claim 4, wherein the emitted radition is in the invisible spectrum.

6. A surveillance system to detect object intrusion into an area according to claim 5, wherein the respective fields of view are generally parallel.

References Cited

UNITED STATES PATENTS

| | | |
|---|---|---|
| 1,877,279 | 9/1932 | Dawson. |
| 2,016,036 | 10/1935 | Fitzgerald _____ 340—228 X |
| 3,036,219 | 5/1962 | Thompson. |
| 3,309,689 | 3/1967 | Keeney _____ 340—258 |
| 3,381,219 | 4/1968 | Dumbeck _____ 250—222 X |
| 3,396,279 | 8/1968 | Tokuda _____ 250—221 |

THOMAS B. HABECKER, Primary Examiner

D. L. TRAFTON, Assistant Examiner

U.S. Cl. X.R.

340—228; 250—83.3